(12) United States Patent
Hedrick (10) Patent No.: US 7,767,075 B2
(45) Date of Patent: Aug. 3, 2010

(54) SYSTEM AND METHOD OF PRODUCING HEAT IN A FLUID CATALYTIC CRACKING UNIT

(75) Inventor: Brian W. Hedrick, Oregon, IL (US)

(73) Assignees: UOP LLC, Des Plaines, IL (US); BP Corporation North America Inc., Warrenville, IL (US)

( * ) Notice: Subject to any disclaimer, the term of this patent is extended or adjusted under 35 U.S.C. 154(b) by 249 days.

(21) Appl. No.: 11/963,101

(22) Filed: Dec. 21, 2007

(65) Prior Publication Data

US 2009/0159497 A1 Jun. 25, 2009

(51) Int. Cl.
*C10G 51/04* (2006.01)
(52) U.S. Cl. .......................... 208/113; 208/46; 208/67; 208/106
(58) Field of Classification Search .................. 208/106, 208/113–124
See application file for complete search history.

(56) References Cited

U.S. PATENT DOCUMENTS

| | | | |
|---|---|---|---|
| 2,888,395 A | 5/1959 | Henny | |
| 2,905,622 A | 9/1959 | McCarthy | |
| 3,137,133 A | 6/1964 | Wilson et al. | |
| 3,363,993 A | 1/1968 | Campbell | |
| 3,401,124 A | 9/1968 | Goulden | |
| 3,554,903 A | 1/1971 | Wilson | |
| 3,726,791 A | 4/1973 | Kimberlin et al. | |
| 3,856,659 A | 12/1974 | Owen | |
| 3,886,060 A | 5/1975 | Owen | |
| 3,928,172 A | 12/1975 | Davis, Jr. et al. | |
| 4,075,831 A | 2/1978 | McGann | |
| 4,158,680 A | 6/1979 | McGann | |
| 4,276,150 A | 6/1981 | McHenry, Jr. | |
| 4,316,794 A | 2/1982 | Schoennagel | |
| 4,338,788 A | 7/1982 | Fink | |

(Continued)

FOREIGN PATENT DOCUMENTS

BE 875 477 10/1979

(Continued)

OTHER PUBLICATIONS

McCabe, W.L. et al. (1993) Unit Operations in Chemical Engineering, 5th ed., McGraw-Hill, 1130 pgs (Office action cites pp. 710-712 & 732-734).*

(Continued)

*Primary Examiner*—Robert J Hill, Jr.
*Assistant Examiner*—Brian McCaig
(74) *Attorney, Agent, or Firm*—Brinks Hofer Gilson & Lione (57) ABSTRACT

Systems and methods of reducing refinery carbon dioxide emissions by increasing synthesis gas production in a fluid catalytic cracking unit having a reactor and a regenerator are disclosed. In one example, a method comprises separating spent catalyst from a hydrocarbon product in the reactor, the spent catalyst having trapped hydrocarbon thereon. The method further comprises reacting an additional feed with the spent catalyst in the reactor to deposit additional coke on the spent catalyst, defining a gas product. The method further separating the gas product and the trapped hydrocarbon from the spent catalyst with a stripping gas. The method further comprises removing coke from the spent catalyst in the regenerator, thereby increasing the amount of synthesis gas production.

18 Claims, 4 Drawing Sheets

U.S. PATENT DOCUMENTS

| | | | |
|---|---|---|---|
| 4,388,218 A | 6/1983 | Rowe | |
| 4,399,651 A | 8/1983 | Geary, Jr. et al. | |
| 4,422,925 A | 12/1983 | Williams et al. | |
| 4,425,259 A | 1/1984 | Hettinger | |
| 4,431,529 A | 2/1984 | Carson | |
| 4,452,048 A | 6/1984 | Geary, Jr. et al. | |
| 4,539,303 A | 9/1985 | Maclean et al. | |
| 4,542,114 A | 9/1985 | Hegarty | |
| 4,600,499 A | 7/1986 | Hettinger, Jr. | |
| 4,776,948 A | 10/1988 | Skraba | |
| 4,888,103 A | 12/1989 | Herbst et al. | |
| 4,927,348 A | 5/1990 | Avidan | |
| 4,965,232 A | 10/1990 | Mauleon | |
| 5,114,682 A | 5/1992 | Goelzer | |
| 5,451,313 A | 9/1995 | Wegerer et al. | |
| 5,538,623 A | 7/1996 | Johnson et al. | |
| 5,597,537 A | 1/1997 | Wegerer et al. | |
| 5,800,697 A | 9/1998 | Lengemann | |
| 6,048,451 A | 4/2000 | Huff, Jr. et al. | |
| 6,110,356 A | 8/2000 | Hedrick et al. | |
| 6,324,895 B1 | 12/2001 | Chitnis et al. | |
| 6,616,899 B1 | 9/2003 | Upson | |
| 6,866,771 B2 | 3/2005 | Lomas et al. | |
| 2004/0120878 A1 | 6/2004 | Mayes, Jr. | |
| 2006/0021909 A1 | 2/2006 | Cerqueira | |
| 2009/0032439 A1 | 2/2009 | Couch et al. | |
| 2009/0035191 A1 | 2/2009 | Couch et al. | |
| 2009/0035193 A1 | 2/2009 | Zhu et al. | |

FOREIGN PATENT DOCUMENTS

| | | |
|---|---|---|
| DE | 1 667 573 | 8/1967 |
| DE | 2021 787 | 11/1971 |
| DE | 36 35 269 A1 | 10/1985 |
| DE | 37 09 185 A1 | 3/1986 |
| EP | 0 083 462 | 7/1983 |
| EP | 0092065 | 10/1983 |
| EP | 0100531 | 2/1984 |
| EP | 0 113 380 A1 | 7/1984 |
| EP | 0162251 | 11/1985 |
| EP | 0 322 274 A1 | 6/1989 |
| EP | 0369537 | 5/1990 |
| EP | 0490453 | 6/1992 |
| EP | 0 629 685 A1 | 12/1994 |
| EP | 1 278 700 B1 | 1/2003 |
| EP | 1935966 | 6/2008 |
| EP | 1939269 | 7/2008 |
| EP | 2022838 | 2/2009 |
| FR | 2596059 | 9/1987 |
| FR | 2 796 932 | 2/2001 |
| GB | 711208 | 6/1954 |
| GB | 2 024 033 A | 1/1980 |
| GB | 2107205 | 4/1983 |
| GB | 2 197 390 A | 5/1988 |
| GB | 2 263 314 A | 7/1993 |
| JP | 59-52529 | 3/1984 |
| JP | 5-17162 | 2/1987 |
| JP | 62-32181 | 2/1987 |
| JP | 62-56919 | 3/1987 |
| JP | 5-320863 | 12/1993 |
| JP | 6-256239 | 9/1994 |
| WO | WO 85/04181 | 9/1985 |
| WO | WO 90/06352 | 6/1990 |
| WO | WO 96/39369 | 12/1996 |
| WO | WO 98/46700 | 10/1998 |
| WO | WO 99/11739 | 3/1999 |
| WO | WO 01/70909 A1 | 9/2001 |
| WO | WO 01/77010 A1 | 10/2001 |
| WO | WO 02/04347 A1 | 1/2002 |
| WO | WO 02/051966 A1 | 7/2002 |
| WO | WO 03/035591 A1 | 5/2003 |
| WO | WO 03/062142 A1 | 7/2003 |

OTHER PUBLICATIONS

U.S. Appl. No. 11/643,497, filed Dec. 21, 2006, Towler et al.
U.S. Appl. No. 11/643,554, filed Dec. 21, 2006, Hedrick et al.
U.S. Appl. No. 11/643,733, filed Dec. 21, 2006, McGehee.
U.S. Appl. No. 11/643,734, filed Dec. 21, 2006, Towler et al.
U.S. Appl. No. 11/962,740, filed Dec. 21, 2007, Hedrick.
U.S. Appl. No. 11/962,763, filed Dec. 21, 2007, Hedrick.
U.S. Appl. No. 11/962,810, filed Dec. 21, 2007, Hedrick.
U.S. Appl. No. 11/963,006, filed Dec. 21, 2007, Towler.
U.S. Appl. No. 11/963,051, filed Dec. 21, 2007, Towler.
J. Terrible, et al.; "Consider using hydrogen plants to cogenerate power needs"; Hydrocarbon Processing (International edition); vol. 78/No. 12; pp. 43-53; Dec. 1999.
D.W. Townsend, et al.; "Heat and Power Networks in Process Design—Criteria for Placement of Heat Engines and Heat Pumps in Process Networks"; AIChe Journal (vol. 29, No. 5); pp. 742-748; Sep. 1983.
D.L. Bonk, et al.: "An Evaluation of Gas Turbines for APFBC Power Plants"; Presented to the Powergen 2000 Conference.
D.L. Bonk, et al.; "First-Generation Circulating Pressurized Fluidized Bed (CPFB) Combustor Power System with Industrial Components"; U.S. Department of Energy (date unknown).
D.G. Tajbl: "UOP Fluid Catalytic Cracking Process"; Handbook of Petroleum Refining Process, R.A. Meyers, Ed.; New York: McGraw Hill 1986.

* cited by examiner

SYSTEM AND METHOD OF PRODUCING HEAT IN A FLUID CATALYTIC CRACKING UNIT

THE NAMES OF THE PARTIES TO A JOINT RESEARCH AGREEMENT

This application is the result of a joint research agreement between UOP LLC and BP Products North America Inc.

BACKGROUND OF THE INVENTION

The present invention relates to systems and methods of reducing carbon dioxide emissions in a refinery through operation of a fluid catalytic cracking (FCC) unit.

The fluidized catalytic cracking of hydrocarbons is the mainstay process for the production of gasoline and light hydrocarbon products from heavy hydrocarbon charge stocks such as vacuum gas oils or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes trapped hydrocarbons from the catalyst by counter-current contact with steam or another stripping medium.

The FCC process is carried out by contacting the starting material—generally vacuum gas oil, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place.

Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas or synthesis gas depending on the choice of feed gas to the regenerator (i.e., air to the regenerator generates flue gas while an artificially created gas comprising oxygen and (1) steam, (2) carbon dioxide or (3) steam and carbon dioxide will generate synthesis gas). The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. Thus, there is a need to provide a way to reduce the carbon dioxide emissions within the refinery through operation of the fluid catalytic cracking unit.

One particular solution to reducing carbon dioxide emissions includes operating the FCC regenerator under gasification conditions by supplying the regenerator with a feed gas comprising oxygen and (1) carbon dioxide, (2) steam, or (3) carbon dioxide and steam. One difficulty with operating the regenerator under gasification conditions is that the reaction between feed gas and coke does not supply enough heat for the FCC reactor operations. In other words, the amount of coke sent to the regenerator under normal FCC operations does not supply enough fuel to drive the FCC reactor heat requirements when the regenerator is under gasification conditions. Therefore, there is a need to provide a way to operate a regenerator under gasification conditions and provide enough heat to operate the FCC reactor.

BRIEF SUMMARY OF THE INVENTION

Embodiments of the present invention generally provide systems and methods of reducing refinery carbon dioxide emissions through operation of a fluid catalytic cracking unit having a reactor and a regenerator at gasification conditions. The systems and methods of the present invention provide solutions to improve gasification conditions and lessen refinery carbon dioxide emissions.

In one example of the present invention, a method is provided for producing heat in a fluidized catalytic cracking unit having a reactor and a regenerator. The method comprises separating spent catalyst from a hydrocarbon product in the reactor, the spent catalyst having trapped hydrocarbon thereon. The method further comprises reacting an additional feed with the spent catalyst in the reactor. The reaction deposits additional coke on the spent catalyst and produces a gas product. The method further comprises separating the gas product and the trapped hydrocarbon from the spent catalyst with a stripping gas. The method further comprises removing coke from the spent catalyst in the regenerator, producing heat for operating the reactor at reactor temperatures.

In another example, a method is provided for producing heat in a fluidized catalytic cracking unit having a reactor, a regenerator and a stripper section with first and second stages. The method comprises separating spent catalyst from a hydrocarbon product in the reactor, the spent catalyst having trapped hydrocarbon thereon. The method further comprises separating with a first stripping gas the trapped hydrocarbon in the first stage of the stripper section of the reactor. The method further comprises reacting an additional feed with the spent catalyst in the second stage of the stripper section. The reaction produces a gas product and deposits additional coke on the spent catalyst. The second stage of the stripper section is located below the first stage of the stripper section and the additional feed is injected into the second stage of the stripper section of the reactor through a feed injection line. The method further comprises separating with a second stripping gas the gas product from the spent catalyst in the reactor, wherein the second stripping gas is injected below the feed injection point. The method further comprises removing coke from the spent catalyst in the regenerator, producing heat for operating the reactor at reactor temperatures.

Additionally, another embodiment provides a system of producing heat in a fluid catalytic cracking unit. The system comprises a reactor for catalytic cracking of hydrocarbon feedstocks and providing spent catalyst, the spent catalyst having trapped hydrocarbons thereon. The system further comprises a stripper section with a feed injection line and a stripper gas line where the stripper section is configured to receive the spent catalyst and the feed injection line is configured to provide an additional feed to react with the spent catalyst. The reaction between the spent catalyst and the additional feed deposits additional coke on the spent catalyst and produces a gas product. The stripper gas line is configured to provide a stripping gas to remove the gas product and the trapped hydrocarbons from the spent catalyst. The system further comprises a regenerator in fluid communication with the reactor, wherein coke is removed from the spent catalyst, producing heat for operating the reactor at reactor temperatures.

In still another embodiment, the system further comprises an additional stripper gas line, wherein the stripper gas line and the additional stripper gas line comprise a first and a second stripping gas. The first stripping gas is injected above the feed injection line in the stripper section and the second stripping gas is injected below the feed injection line to create two-stages in the stripper section, a first and a second stage. The first stage is located above the feed injection line and includes the first stripping gas. The second stage is located below the first stage and includes the feed injection line and the second stripping gas.

Further objects, features, and advantages of the present invention will become apparent from consideration of the following description and the appended claims when taken in connection with the accompanying drawings.

BRIEF DESCRIPTION OF THE DRAWINGS

FIG. 1b is a schematic diagram of a reactor and a regenerator of the fluid catalytic cracking unit of FIG. 1a;

DETAILED DESCRIPTION OF THE INVENTION

Embodiments of the present invention generally provide systems and methods of reducing carbon dioxide emissions in a refinery through operation of a fluid catalytic cracking (FCC) unit having a reactor and a regenerator at gasification conditions. In one embodiment, this is accomplished by introducing an additional feed to a stripper section of the reactor, depositing additional coke on a spent catalyst. The spent catalyst with a higher level of coke is then burned in the regenerator under gasification conditions to produce more heat. The additional heat is transferred with the regenerated catalyst to the reactor, thereby supplying the reactor with enough heat to operate it effectively while running the regenerator under gasification conditions.

Additionally, burning the spent catalyst with a higher level of coke produces a larger volume of synthesis gas, typically comprising hydrogen, carbon dioxide, carbon monoxide and steam. The carbon dioxide can be readily sequestered in an amine absorber. Subsequently, carbon monoxide and steam can form carbon dioxide and hydrogen in a water gas shift reaction. The increased amount of hydrogen can be used as a fuel source, thereby reducing the need for an additional source such as a hydrogen furnace, and all the fuel burned therein. By reducing or eliminating the need for a hydrogen furnace and by sequestering the carbon dioxide, these embodiments help lower the amount of overall carbon dioxide emissions from the refinery.

Figure 1A:
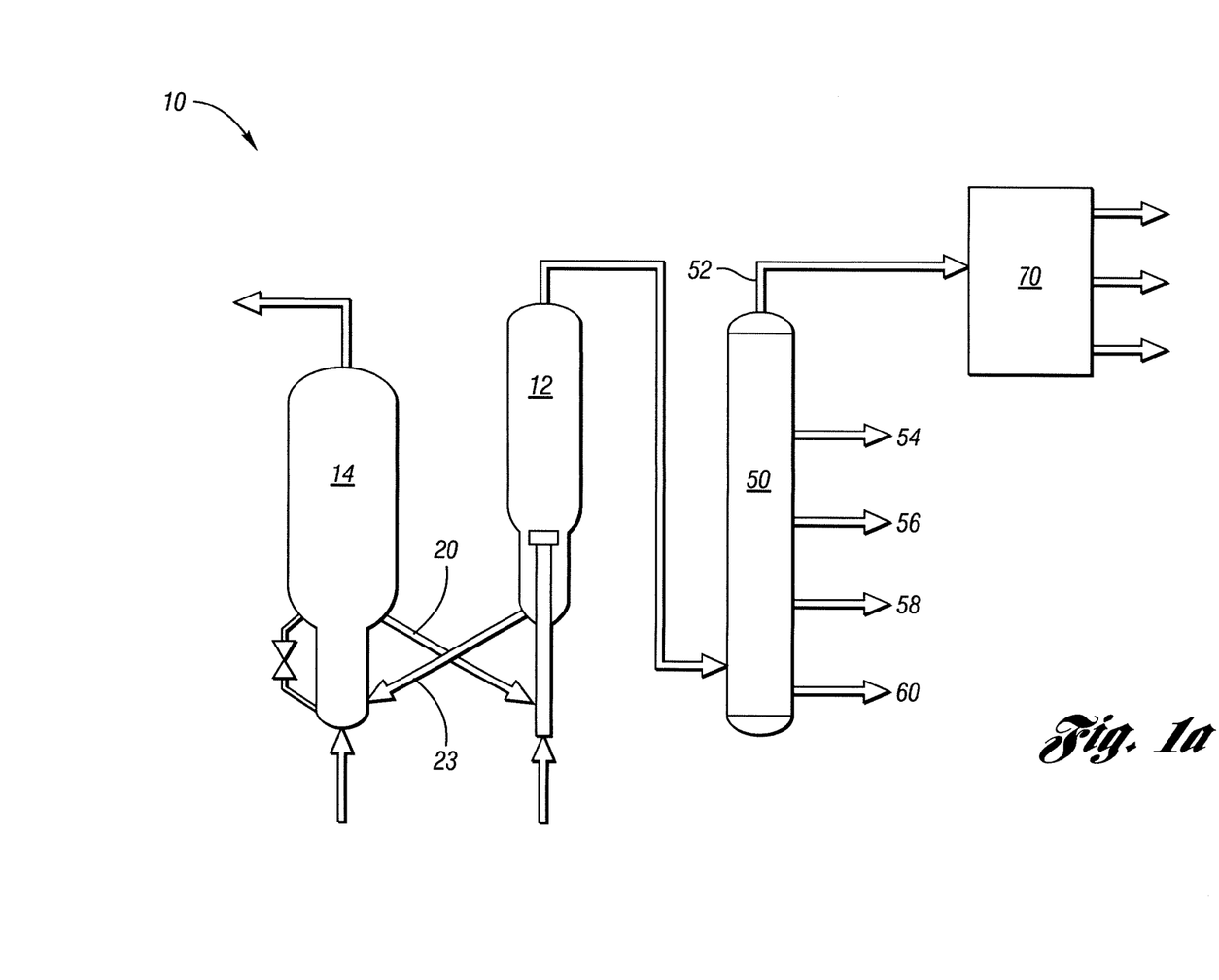
FIG. 1a is a schematic diagram of a fluid catalytic cracking unit.

FIG. 1a illustrates a fluid catalytic cracking (FCC) unit and separation system 10. As shown, the FCC unit 10 comprises a reactor 12 that is configured to receive a FCC feedstock (fresh feed) and a regenerator 14 in fluid communication with the reactor 12 to receive spent catalyst. In this embodiment, the reactor 12 cracks the feedstock therein to an effluent containing hydrocarbons ranging from methane through relatively high boiling point materials along with hydrogen and hydrogen sulfide. During the cracking reaction, a carbonaceous by-product is deposited on the circulating catalyst. This material, termed "coke," is continuously burned off the spent catalyst in the regenerator 14.

The FCC unit 10 comprises the regenerator 14 for regenerating spent catalyst from the reactor 12. In this embodiment, the regenerator 14 is configured to receive an artificially created feed gas and spent catalyst from the reactor 12. A preferred embodiment includes recycling carbon dioxide from a synthesis gas separation unit (not shown) plus oxygen from an oxygen generation unit (not shown). From the reactor 12, the spent catalyst has coke deposited thereon, reducing the activity of the catalyst.

Operating under gasification conditions, the regenerator 14 receives the feed gas to burn coke off the spent catalyst, thereby producing a synthesis gas that exits a synthesis gas line to a synthesis-gas system. To produce high quality synthesis gas, the feed gas to the regenerator preferably comprises oxygen and (1) steam, (2) carbon dioxide, or (3) steam and carbon dioxide. Additionally, it is highly preferred that the feed gas does not contain nitrogen (i.e. the feed gas is not air). The generated synthesis gas may comprise carbon monoxide, hydrogen, carbon dioxide, steam, carbonyl sulfide, and hydrogen sulfide. Since the feed gas does not contain nitrogen, the synthesis gas does not have to be routed through a nitrogen separation unit. Additionally, the carbon dioxide in the synthesis gas can be sequestered and scrubbed in an amine absorber or recycled to the regenerator as part of the incoming feed gas.

It is noted that the FCC unit 10 may have a number of additional, optional uses associated with the synthesis gas system. The synthesis gas exits the regenerator 14 at a high temperature, approximately 600 to 800° C. (1100 to 1500° F.), and at pressures of approximately 1.3 to 3.4 atmospheres (20 to 50 pounds per square inch gauge (psig)). One optional use for the synthesis gas could be as an energy source to drive a turboexpander-generator system for electrical power generation. Another optional use for the synthesis gas would be to convert the carbon monoxide in the synthesis gas to $CO_2$ through combustion in a CO boiler and produce high-pressure steam.

Regarding the regenerator 14, it is preferably configured to rejuvenate or reactivate the spent catalyst by burning the deposited coke off the spent catalyst with the feed gas at predetermined temperatures that is at a relatively high temperature (typically between 650-815° C. (1200-1500° F.)).

The regenerator 14 reactivates the catalyst so that, when returned to the reactor 12, the catalyst is in optimum condition to perform its cracking function. The regenerator 14 serves to gasify the coke from the catalyst particles and, at the same time, impart sensible heat to the circulating catalyst. The energy carried by the hot regenerated catalyst is preferably used to satisfy the thermal requirements for the reactor 12 of the FCC unit 10.

It has been discussed that imparting heat to the circulating, regenerated catalyst can be difficult when operating the regenerator 14 under gasification conditions. The amount of coke sent to the regenerator 14 under normal FCC operations does not supply enough fuel to drive the FCC reactor heat requirements when the regenerator 14 is operating under gasification conditions. In other words, gasification conditions may not transfer enough heat with the regenerated catalyst to operate the FCC reactor 12 at typical reactor temperatures (typically between 480-760° C. (900-1400° F.)). Embodiments of this invention, discussed below, assist in providing enough heat for the FCC reactor 12 while operating the regenerator 14 under gasification conditions.

Figure 1B:
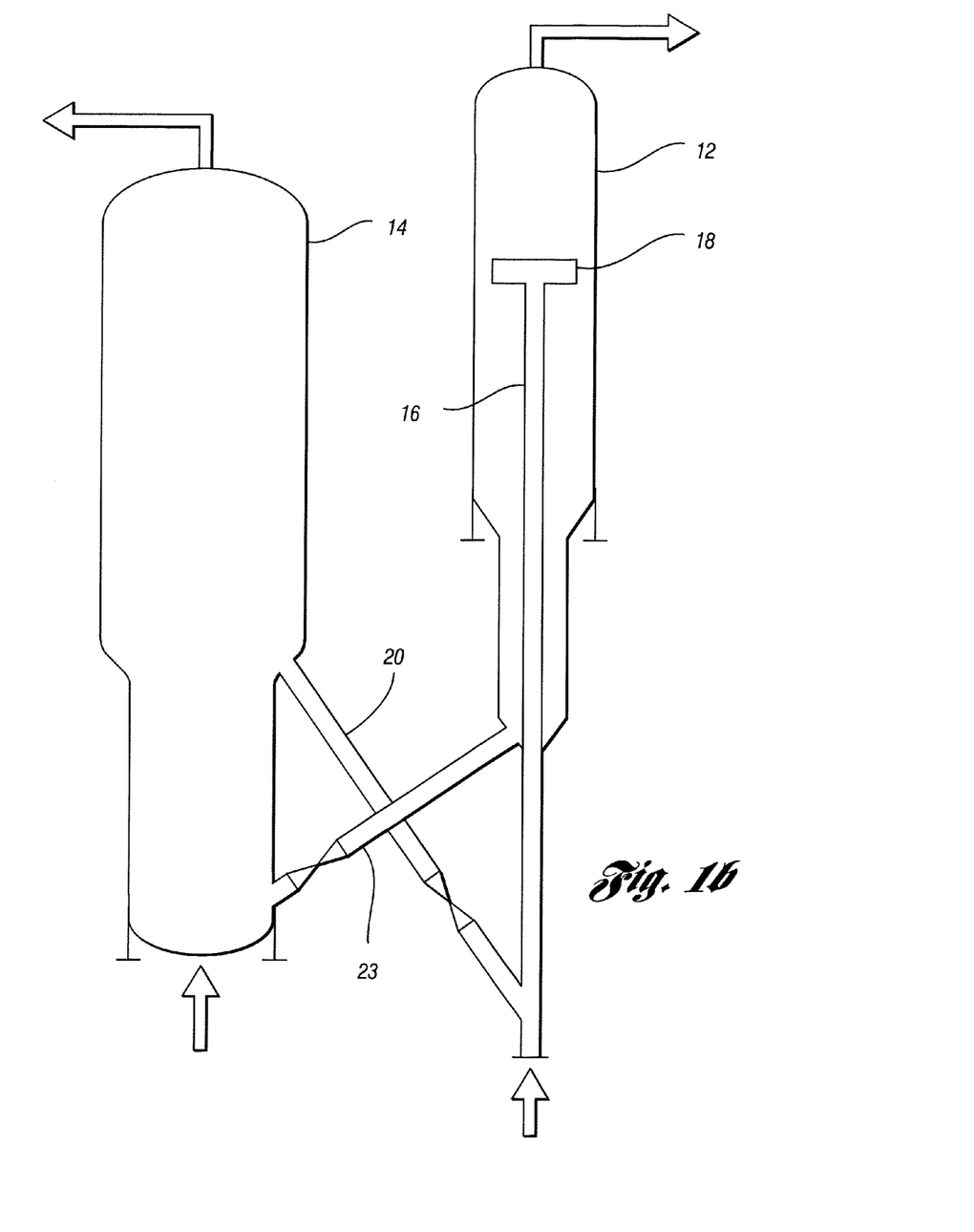

Referring now to FIGS. 1a to 1b, from the regenerator 14, hot regenerated catalyst is preferably fed back to the reactor 12 via a reactivated catalyst return line 20. The regenerated catalyst vaporizes the hydrocarbon feedstock to define resultant vapors. The resultant vapors carry the catalyst upward through a riser 16 of the reactor 12 with a minimum of back mixing. At the top of the riser 16, desired cracking reactions have been completed and the spent catalyst is relatively quickly separated from the hydrocarbon product to minimize secondary reactions. The catalyst-hydrocarbon mixture from the riser is discharged into the reactor vessel through a separation device 18, e.g., a riser termination device, achieving a substantial degree of initial catalyst-gas separation, e.g., at least 90 weight percent hydrocarbon product separation from catalyst.

The reactor effluent is preferably directed to a main fractionator or fractionation column 50 (discussed in greater detail below) of the unit 10 for resolution into gaseous light olefin co-products, FCC gasoline, and cycle stocks. The spent catalyst drops from within the reactor vessel into a stripper section 24 thereof, where a countercurrent flow of stripping gas removes trapped hydrocarbon, defining stripped spent catalyst. Stripped spent catalyst descends through a standpipe 23 and into the regenerator 14.

To maintain the activity of the working-catalyst inventory at a desired level and to make up for any catalyst lost from the system with the synthesis gas, fresh catalyst may be introduced into the circulating-catalyst system by any suitable manner. For example, this may be accomplished by way of a catalyst storage hopper (not shown). Moreover, an additional storage hopper (not shown) may be used to hold spent catalyst withdrawn from the circulating system as necessary to maintain the desired working activity and to hold all catalyst inventory when the FCC unit 10 is shut down for maintenance and repairs.

As shown in FIGS. 1a to 1b, in the operation of the FCC unit 10, fresh feedstock and (depending on product-distribution objectives) recycled cycle oils are introduced into the bottom of the riser 16 together with a controlled amount of regenerated catalyst. The charge may be preheated, either by heat exchange or, for some applications, by means of a fired heater.

Feedstocks for the FCC process include mixtures of hydrocarbons of various types, including relatively small molecules such as found in gasoline to large molecules of 60 or more carbon atoms. The feedstock may include a relatively small content of contaminant materials such as organic sulfur, nitrogen compounds, and organometallic compounds. It is noted that the relative proportions of all such materials will vary with the geographic origin of the crude and the particular boiling range of the FCC feedstock. The feedstocks may be ranked in terms of their "crackabilities," or the ease with which they can be converted in an FCC unit. Crackability may be defined by a function of the relative proportions of paraffinic, naphthenic, and aromatic species in the feed.

Referring to FIG. 1a, the FCC unit 10 further includes a main-fractionation column 50 through which the reactor effluent is separated into various products. The main-fractionation comprises an overhead line 52, a first side cut line 54, a second side line 56, a third side cut line 58, and a bottom line 60. As shown, the overhead line 52 includes gasoline and lighter material. The overhead line 52 typically has an initial boiling point in the $C_5$ range and an end boiling point, or cut point, in the range of 150-205° C. (300-400° F.), preferably around 193° C. (380° F.). The first side cut line 54 includes naphtha, typically having a lower cut point between 120-193° C. (250-380° F.) and an upper cut point around 193-250° C. (380-480° F.), preferably around 215° C. (420° F.). The second side cut line 56 includes light cycle oil, typically having a boiling point range between 230° C. and 370° C. (450° F. and 700° F.). The third side cut line 58 includes heavy cycle oil, typically having a boiling point range between 260° C. and 370° C. (500° F. and 700° F.). Finally, the bottom line 60 includes slurry oil or clarified oil, typically with a boiling range that extends as high as the end point of the initial feed stock to the reactor (i.e. approximately 510-565° C. (950-1050° F.)). It is noted that the lines may include other products without falling beyond the scope or spirit of the present invention.

Reactor-product vapors are directed to the main fractionator 50 at which gasoline and gaseous olefin-rich co-products are taken overhead and routed to a gas-concentration unit 70. At the main-fractionator 50, light-cycle oil is recovered as a side cut with the net yield of this material being stripped for removal of light ends and sent to storage. Net column bottoms are yielded as slurry or clarified oil. Because of the high efficiency of the catalyst-hydrocarbon separation system utilized in the reactor design, catalyst carry-over to the fractionator 50 is minimized and it is not necessary to clarify the net heavy product yielded from the bottom of the fractionator 50 unless the material is to be used in some specific application requiring low solids content such as the production of carbon black. In some instances, heavy material can be recycled to the base of reactor riser 16 to be combined with fresh feed.

Maximum usage is made of the heat available at the main column 50. Typically, light-cycle and heavy-cycle oils are utilized in the gas-concentration section 70 for heat-exchange purposes, and steam is generated by circulating the main-column bottoms stream.

In this embodiment, the FCC unit 10 further includes the gas-concentration column 70 or an "unsaturated gas plant" in fluid communication with the overhead line 52 of the main-fractionation column 50. From the overhead line 52, the gas-concentration column 70 receives unstable gasoline and lighter products that are separated therethrough into fuel gas for alkylation, polymerization, and debutanized gasoline.

The gas-concentration section 70, or unsaturated-gas plant, may be one or an assembly of absorbers and fractionators that separate the main-column overhead into gasoline and other desired light products. Olefinic gases from other processes such as coking may be also sent to the FCC gas-concentration section. The gas-concentration unit may have one or a plurality of columns. For example, the gas-concentration unit may be a "four-column" gas-concentration plant comprising a primary absorber, a secondary absorber, a stripper, and a debutanizer. In this embodiment, gas from the FCC main-column overhead receiver is compressed and directed to the gas-concentration unit.

Figure 2:
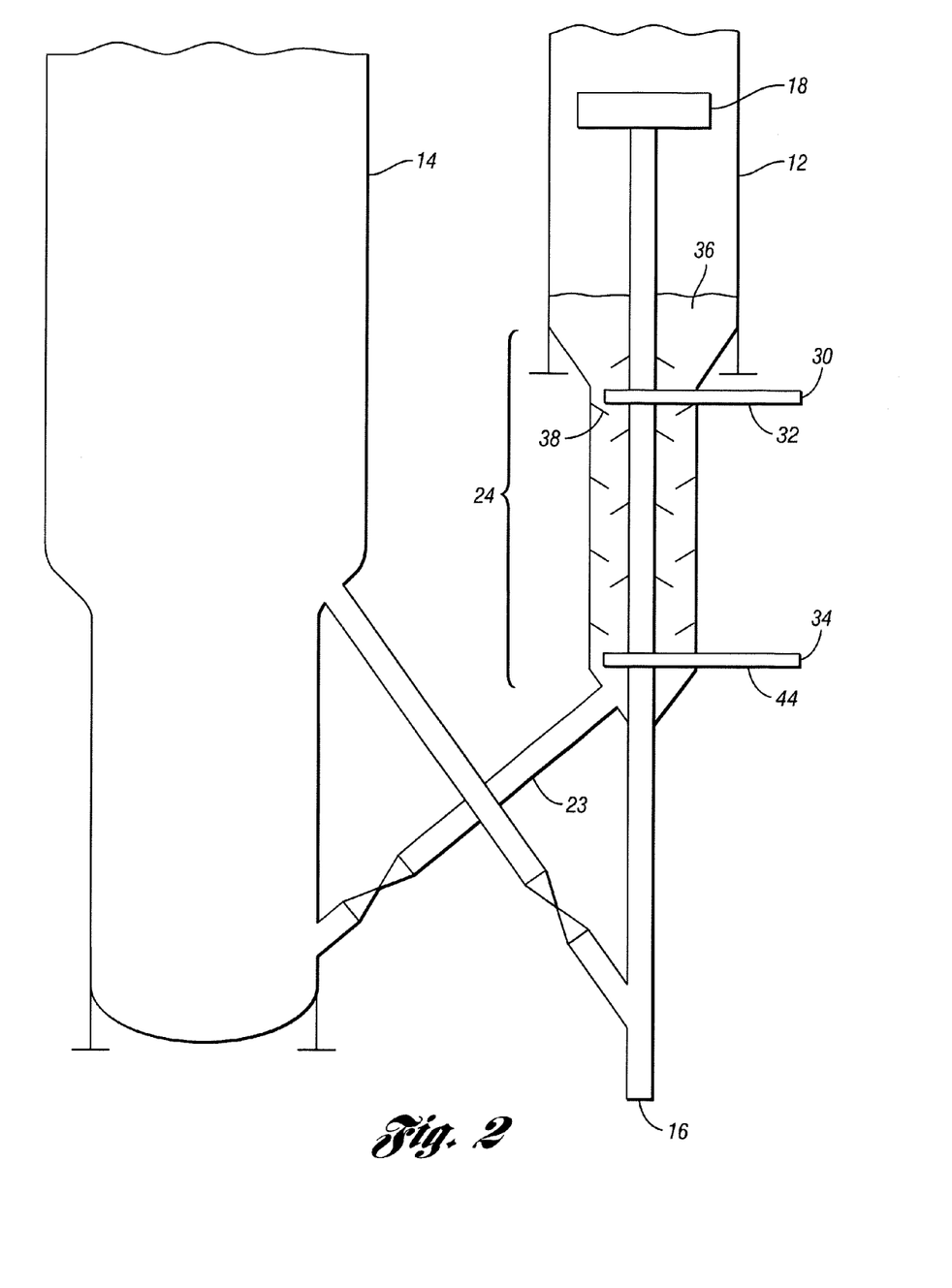
FIG. 2 is a schematic diagram of a stripper section of a fluid catalytic cracking reactor.

A preferred embodiment, shown in FIG. 2, implements the production of a larger amount of synthesis gas through injection of an additional feed 30 to the stripper section 24 of the reactor 12. The method and system begin with an FCC feedstock reacting with a regenerated catalyst in the riser 16 to create a hydrocarbon product and a spent catalyst. At the top of the riser 16, the desired cracking reactions have been completed and the spent catalyst is relatively quickly separated from the hydrocarbon product to minimize secondary reactions. The catalyst-hydrocarbon mixture from the riser is discharged into the reactor vessel through a separation device 18, e.g., a riser termination device, achieving a substantial degree of initial catalyst-gas separation, e.g., at least 90 weight percent product vapor separation from catalyst. The spent catalyst is collected in the stripper section 24 of the reactor 12.

At this point, an additional feed 30 is injected into the stripper section 24 of the reactor 12 through a feed injection line 32. The feed reacts with the spent catalyst in the stripper section 24 to produce additional coke on the spent catalyst and a gas product. A stripping gas 34, preferably steam, is injected through a stripper gas line 44 below the feed injection line 32 to help separate the gas product from the spent catalyst through a counter-current flow arrangement. In this embodiment, the stripping gas 34 also is used to separate trapped hydrocarbons that were entrained with the spent catalyst leaving the separation device 18.

Based on the need to strip the spent catalyst from the gas product and trapped hydrocarbons, certain arrangements are preferred. The trapped hydrocarbons produced from the reaction in the riser 16 should be stripped at a minimum temperature (approximately 537° C. (1000° F.)) to ensure the trapped hydrocarbons do not condense on the spent catalyst. The temperature of the spent catalyst in the stripper section 24 is hotter before the additional feed 30 is injected through the feed injection line 32. The additional feed 30 will reduce the temperature of the spent catalyst to satisfy sensible and latent heat requirements. This temperature drop makes it more difficult to strip the trapped hydrocarbons from the spent catalyst.

Therefore, it is desirable to have some amount of time to strip the trapped hydrocarbons from the spent catalyst prior to injection of the additional feed. A preferred embodiment is to place the feed injection line 32 at least 3 trays or theoretical stages below the top of the spent catalyst bed 36 in the stripper section 24 to strip the trapped hydrocarbons before condensing on the spent catalyst.

An additional embodiment that may be employed is to control how much of the trapped hydrocarbons and the gas product are stripped in the stripper section 24. It may be desireable to not strip the entire amount of the trapped hydrocarbons and the gas product in the stripper section 24. Instead, a portion of these gas streams may be sent with the spent catalyst to the regenerator 14 for burning. As mentioned, injecting the additional feed into the stripper section will lower the temperature of spent catalyst in the stripper section 24. Lowering the temperature makes it more difficult to strip some of the heavy hydrocarbons in the trapped hydrocarbons. Additionally, it will be harder to strip some of the heavy hydrocarbons in the gas product created during the reaction of the spent catalyst and the additional feed. Instead of increasing the flow of stripping gas 34 to try to remove these heavy hydrocarbons, the heavy hydrocarbons can be sent with the spent catalyst to the regenerator. This is because these heavy hydrocarbons represent some of the undesirable components that are not worth sending with the reactor effluent from the riser 16 to the fractionator column 50. Therefore, it may be more efficient to not strip these heavy hydrocarbons in the stripper section 24. Instead, the heavy hydrocarbons can be sent to the regenerator 14 to be burned, producing additional synthesis gas and additional heat to be transferred to the reactor.

Returning to FIG. 2, the spent catalyst moves downward from the stripper section 24 toward a standpipe 23. The spent catalyst contacts the stripping gas 34, which counter-currently moves upward toward the top of the reactor 12. The stripped catalyst descends through the standpipe 23 to the regenerator 14. In the regenerator 14, coke is burned off the spent catalyst, producing synthesis gas and heat to be transferred to the reactor.

A preferred embodiment of the stripper section in FIG. 2 is the presence of a series of sloping baffles 38 within the stripper section of the reactor. Sloping baffles 38 assist in the removal of hydrocarbon from the spent catalyst by increasing contact time between the spent catalyst and the stripping gas.

Various feeds can be injected into the stripper section 24 of the reactor 12. For instance, a reactor effluent product stream from the fluid catalytic cracking unit 10 can be used. As shown if FIG. 1a, the FCC unit 10 includes a main-fractionation column 50 which separates the reactor effluent, or hydrocarbon product, into various product streams. The bottom line 60, with slurry oil, is the preferred reactor effluent stream to be returned to the reactor. The slurry oil contains heavy hydrocarbons that possibly did not react with the catalyst when first introduced into the riser 16 as a part of the FCC feedstock. Alternatively, other feed streams can be introduced into the reactor 12, including feed or product streams from other units within the refinery (such as low-value, heavy hydrocarbon streams with typical boiling ranges between 340° C. and 565° C. (650° F. and 1050° F.)). Examples of low-value, heavy hydrocarbon streams include solvent deasphalt (SDA) pitch, vacuum residue, and ethylene furnace tar. Vacuum residue is comprises as a low value hydrocarbon fraction of crude which is rich in asphaltenes and heavy Conradson carbon, e.g. 18 to 30 or more. SDA pitch comprises the portion of the vacuum residue that is insoluble in a paraffinic solvent. SDA pitch contains the majority of the vacuum residue's asphaltenes and Conradson carbon and is therefore very rich in carbon.

One main purpose of introducing an additional feed 30 to the stripper section 24 of the reactor 12 is to deposit delta coke on the catalyst (in addition to the coke deposited on the catalyst from the reaction with FCC feedstock in the riser 16). Typically, the spent catalyst will contain around 4 wt % coke or less. Introducing the slurry oil, in particular, allows heavy hydrocarbon compounds from the FCC fractionation column 50 to be reacted with spent catalyst. This can lead to more coke (combined coke is more than 4 wt %, preferably higher than 10 wt %) being deposited on the spent catalyst in comparison to a lighter reactor effluent product stream, like the naphtha 54 or light cycle oil 58 product streams. Additionally, the slurry oil in the bottom line 60 includes an amount of unreacted feedstock that does not have much value in comparison to other reactor effluent product streams. Re-introducing the slurry oil in the bottom line 60 to the spent catalyst in the stripper section 24 will allow additional reaction to take place. The reaction may deposit additional coke on the spent catalyst and a possibly create a more useful product. The opportunity for reaction with the spent catalyst is enhanced in the stripper section 24. Residence time in the stripper section is much higher in comparison to residence time between the spent catalyst and FCC feedstock in the reactor riser 16. Therefore, there is a longer opportunity for the feed to react with the spent catalyst and deposit additional coke.

Depositing additional coke on the catalyst in the stripper section 24 leads to the opportunity to produce additional synthesis gas in the regenerator 14. When the catalyst moves from the stripper section 24 to the regenerator 14 through the standpipe 23, the spent catalyst is regenerated by burning the coke off the catalyst. Oxygen reacts with the coke on the spent catalyst to produce carbon monoxide, hydrogen, carbon dioxide, and steam, among other compounds. To burn off the additional coke on the spent catalyst created by the reaction between the additional feed 30 and spent catalyst in the stripper section 24, additional oxygen is required in the regenerator 14. A complete regeneration of the spent catalyst with this additional amount of coke results in a larger amount of synthesis gas produced in the regenerator 14.

In addition to creating a larger amount of synthesis gas, burning all of the coke will produce more heat. A portion of this heat will be carried with the regenerated catalyst to the reactor 12. As discussed, one possible problem with operating under gasification conditions is an inability to produce the heat required to run the reactor 12. By adding an additional feed to deposit delta coke on the spent catalyst in the stripper section 24 of the reactor 12, there is a resulting increase in heat in the regenerator 14. This increase in heat is due to the additional burning of coke in the regenerator 14, which now can supply the heat required by the reactor 12.

Producing a larger amount of synthesis gas in the regenerator 14 is beneficial in the goal of reducing the amount of carbon dioxide emitted from refinery operations. Synthesis gas, which may include hydrogen and carbon monoxide, can be used as a fuel source for other refinery units. Through production of additional synthesis gas in the FCC unit 10, other refinery operations no longer have to produce similar fuel sources. With other refinery units no longer having to produce fuel sources, the carbon dioxide emissions from these units decline. In other words, producing more synthesis gas in the FCC unit 10 can reduce the amount of carbon dioxide emissions in the overall refinery.

It should be noted that the increased production of synthesis gas in the FCC unit 10 produces a larger amount of hydrogen, carbon dioxide, carbon monoxide, and steam within the FCC unit 10. While there is an increased amount of carbon dioxide being produced in the regenerator, the carbon dioxide is generally "clean" and capable of being sequestered more readily than other carbon dioxide emissions within other units in the refinery. Carbon monoxide and steam can react to produce additional hydrogen and carbon dioxide through a water gas shift reaction. The increased hydrogen production from the regenerator can replace other hydrogen production facilities within the refinery, such as a hydrogen furnace. Therefore, the amount of carbon dioxide emissions from the hydrogen furnace or another facility is reduced or eliminated. Therefore, taken as a whole, the overall carbon dioxide emissions for the refinery are lowered through this process.

Figure 3:
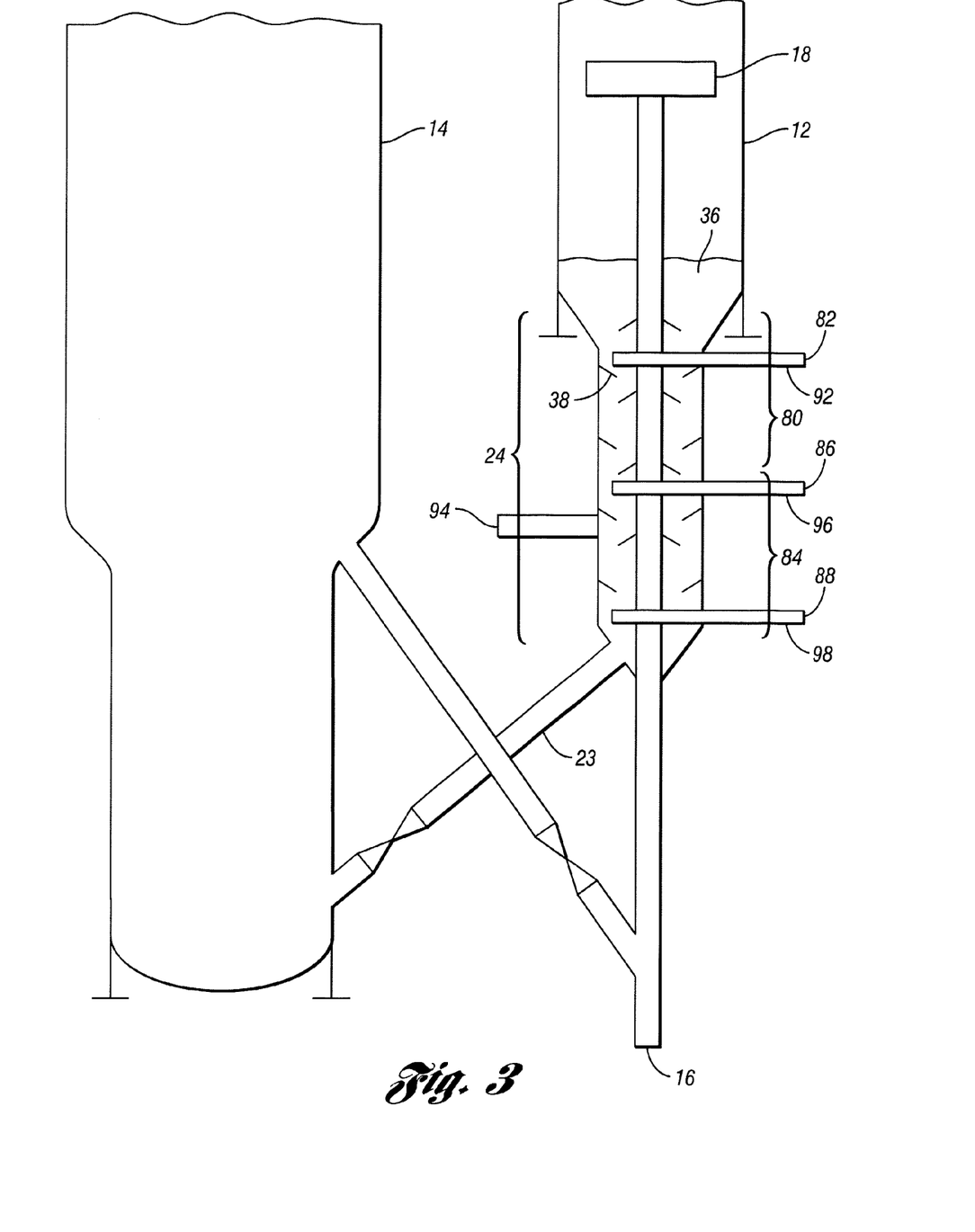
FIG. 3 is a schematic diagram of a stripper section with two stages of a fluid catalytic cracking reactor.

FIG. 3, displaying another embodiment, includes a stripper section 24 with two stages or zones. At the top of the riser 16, desired cracking reactions have been completed and the spent catalyst is relatively quickly separated from the hydrocarbon product to minimize secondary reactions. The catalyst-hydrocarbon mixture from the riser is discharged into the reactor vessel through a separation device 18, e.g., a riser termination device, achieving a substantial degree of initial catalyst-gas separation, e.g., at least 90 weight percent hydrocarbon product separation from catalyst. The spent catalyst collected in the stripper section 24 of the reactor 12 is divided into two stages or zones. A first-stage 80 of the stripper section 24, or top zone, receives the spent catalyst that falls down from the separation device 18. The spent catalyst contains trapped hydrocarbons between the spent catalyst particles and absorbed by the spent catalyst. A first stripping gas 82, preferably steam, is injected through a first stripper gas line 92 into the first-stage 80 of the stripper section 24 to strip the trapped hydrocarbons from the spent catalyst. The first stripping gas 82 flows counter-current to the flow of spent catalyst. The spent catalyst contacts the first stripping gas 82 that is moving upward toward the top of the reactor 12. The stripped spent catalyst moves downward from the first-stage 80 of the stripper section 24 toward a second-stage 84 of the stripper section 24, or bottom zone.

In the second-stage 84 of the stripper section 24, an additional feed 86 is injected through a feed injection line 96. The preferred location of the feed injection line 96 is near the top of the second-stage 84 of the stripper section 24. The feed 86 reacts with the stripped spent catalyst in the second-stage 84 of the stripper section 24 to produce additional coke on the spent catalyst as well as a gas product. A second stripping gas 88, preferably steam, is injected through a second stripper gas line 98 located below the feed injection line 96 to help separate the gas product from the reaction through a counter-current flow. The second stripping gas 88 moves upward toward the first-stage 80 of the stripper section 24. The spent catalyst moves downward from the second-stage 84 of the stripper section 24 toward a standpipe 23 that transfers the spent catalyst to the regenerator 14. In the regenerator 14, coke is burned off the catalyst, producing synthesis gas and heat to be sent to the reactor.

An additional preferred embodiment to the stripper section 24 in FIG. 3 is the presence of a series of sloping baffles 38 within the stripper section of the reactor. Sloping baffles 38 assist in the removal of hydrocarbon from the spent catalyst by increasing contact time between the spent catalyst and the first and second stripping gases.

Additionally, sloping baffles 38 may be used to help redirect gas flow from the second-stage 84 of the stripper section 24 to a second stage gas product line 94. One purpose of the second stage gas product line 94 is to limit the amount of second stage gas product that enters the first stage 80 of the stripper section 24. At the point in which the spent catalyst enters the second stage 84 of the stripper section 24 from the first-stage 80 of the stripper section 24, most of the trapped hydrocarbons have been effectively stripped from the spent catalyst. Introducing a second stage gas product line 94 may be used to maintain separation between the trapped hydrocarbons stripped in the first stage 80 and the gas product stripped from the second stage 84.

An additional embodiment of the stripper section 24 in FIGS. 2 and 3 involves a specific technology used to assist the stripping of hydrocarbons from the catalyst. Packing, trays or grids are typically used in FCC stripper sections. These technologies can help increase the catalyst circulation within the FCC unit as well as improve efficiency of the unit and increase capacity. Packing is currently the preferred embodiment to be included in the stripper section 24 to assist in the separation of hydrocarbon from catalyst.

The following example (displayed in Tables 1 and 2) further illustrates embodiments of the invention. A comparison is made between: (1) a FCC unit with a reactor and a regenerator operating under combustion conditions (i.e. using air as the feed gas to the regenerator) and (2) a FCC unit with a reactor and a regenerator operating under gasification conditions (i.e. using an artificially created feed gas comprising carbon dioxide and oxygen). Under normal FCC operations, the heat produced in the regenerator under combustion and gasification conditions ("total heat available") is transferred to operate the reactor ("total heat required").

In Table 1, this example calculates the total heat required by the reactor when a feedstock enters the riser at 450° F. and the reactor product exits at 980° F. The total heat available in the regenerator is calculated with the regenerator operating at 1275° F. and circulating 7 lbs of catalyst per pound of FCC feedstock. Assuming the coke has an approximate formula of $C_{22}H_{11}$ and contains an indistinguishable amount of sulfur, the example requires 13.75 lbs of air (under combustion conditions) to burn each lb of coke. Based on these operating conditions and assumptions, the reactor has a total heat requirement of 620 Btu per lb of feedstock. The regenerator, under combustion conditions, has a total heat available of 13,332 Btu per lb of coke. Therefore, the minimum amount of coke on catalyst to supply the required heat to the reactor is 0.0475 lb coke/lb feedstock [(620 Btu/lb of feedstock)/(13,332 Btu/lb of coke)].

TABLE 1

FCC Unit Operating Under Combustion Conditions

| Reactor | | Regenerator | |
| --- | --- | --- | --- |
| Source | Btu/lb of feed | Source | Btu/lb of coke |
| ΔH Feed | 475 | ΔH Air/Flue Gas | −3,452 |
| ΔH Reaction | 132 | ΔH Combustion | 16,775 |
| ΔH Steam | 10 | Heat Loss | −255 |
| Heat Loss | 3 | | |
| Total Heat Required | 620 | Total Heat Available | 13,332 |

Coke = Total Heat Required/Total Heat Available = 620/13332 * 100% = 4.75%

In Table 2, this example shifts from combustion conditions to gasification conditions in the regenerator. If reactor conditions remain the same as Table 1 (i.e. feedstock entering at 450° F. and product exiting at 980° F.), then the total heat required by the reactor will remain the same (620 Btu per lb of feedstock). Additionally, the regenerator will have to supply catalyst to the reactor at the same rate and temperature. Under gasification conditions, the total heat available can vary depending on the concentration of oxygen and carbon dioxide in the feed gas. In this example, assume the following reaction represents the heat of combustion based on one ratio of oxygen to carbon dioxide ($C_{22}H_{11}+8\frac{1}{2}O_2+5\ CO_2 \rightarrow 27\ CO+5\frac{1}{2}H_2$). This reaction produces approximately 2,711 Btu per lb of coke. Assuming that the incoming feed gas must be heated from 100° F. to 1275° F., the heat requirement is approximately 571 Btu per lb of coke ((1.8 lb gas per lb coke*0.27 Btu per lb °F.*(1275° F.-100° F.)). The regenerator, under gasification conditions, has a total heat available of 1,885 Btu per lb of coke. In this example, the minimum amount of coke on catalyst to supply the required heat to the reactor is 0.329 lb coke/lb feedstock [(620 Btu/lb of feedstock)/(1,885 Btu/lb of coke)]. As discussed, this increased coke level is not typically achieved during normal operations of the FCC unit.

TABLE 2

FCC Unit Operating Under Gasification Conditions

| Reactor | | Regenerator | |
| --- | --- | --- | --- |
| Source | Btu/lb of feed | Source | Btu/lb of coke |
| ΔH Feed | 475 | ΔH Feed Gas/Syn Gas | −571 |
| ΔH Reaction | 132 | ΔH Combustion | 2,711 |
| ΔH Steam | 10 | Heat Loss | −255 |
| Heat Loss | 3 | Total Heat Available | 1,885 |
| Total Heat Required | 620 | | |

Coke = Total Heat Required/Total Heat Available = 620/1885 * 100% = 32.9%

While the present invention has been described in terms of preferred embodiments, it will be understood, of course, that the invention is not limited thereto since modifications may be made to those skilled in the art, particularly in light of the foregoing teachings.

What is claimed is:

1. A method of producing in a fluid catalytic cracking unit containing a regenerator, a reactor, and a stripper section with first and second stages, the method comprising:
    separating spent catalyst from a hydrocarbon product in the reactor, the spent catalyst having trapped hydrocarbon thereon;
    separating with a first stripping gas the trapped hydrocarbon in the first stage of the stripper section of the reactor;
    reacting an additional feed with the spent catalyst in the second stage of the stripper section, defining a gas product and depositing additional coke on the spent catalyst, wherein the second stage of the stripper section is located below the first stage of the stripper section and the additional feed is injected into the second stage of the stripper section of the reactor through a feed injection line;
    separating with a second stripping gas the gas product from the spent catalyst in the second stage of the stripper section, wherein the second stripping gas is injected below the feed injection line; and
    removing coke from the spent catalyst in the regenerator, producing heat for operating the reactor at reactor temperatures.

2. A method of claim 1 wherein the additional feed is a coke-producing heavy hydrocarbon feed selected from the group consisting of sulfur deasphalt pitch, vacuum residue, ethylene furnace tar, and slurry oil.

3. A method of claim 1 wherein the feed comprises a slurry feed from a FCC fractionator bottom stream.

4. A method of claim 1 wherein the first stripping gas and the second stripping gas comprise steam.

5. A method of claim 1 wherein the gas product formed in the second stage of the stripper section is removed from the reactor before contact with the first stage of the stripper section.

6. A method of claim 1 wherein the heat produced in the regenerator supplies the reactor with at least approximately 600 BTU per pound of feedstock.

7. A method of claim 1 wherein the feed injection line is at least three theoretical stages below the top of a catalyst bed surface.

8. A method of claim 1 wherein the first stripping gas comprises steam.

9. A method of claim 1 wherein a fraction of the trapped hydrocarbons and the gas product, defining heavy hydrocarbons, is not separated from the spent catalyst and transferred with the spent catalyst to the regenerator.

10. A system for producing heat in a fluid catalytic cracking unit, the system comprising:
   a reactor for catalytic cracking of hydrocarbon feedstocks and providing spent catalyst, the spent catalyst having trapped hydrocarbons thereon, the reactor comprising a stripper section with a feed injection line and first and second stripper gas lines, the stripper section configured to receive the spent catalyst, the feed injection line configured to provide an additional feed to react with the spent catalyst thereby depositing additional coke on the spent catalyst and producing a gas product, the first and second stripper gas lines configured to provide first and second stripping gases to remove the gas product and the trapped hydrocarbons from the spent catalyst;
   wherein the first stripping gas is injected above the feed injection line in the stripper section and the second stripping gas is injected below the feed injection line, thereby creating two-stages in the stripper section, a first and a second stage, the first stage located above the feed injection line and including the first stripping gas and the second stage located below the first stage and including the feed injection line and the second stripping gas; and
   a regenerator in fluid communication with the reactor, wherein coke is removed from the spent catalyst, producing heat for operating the reactor at reactor temperatures.

11. The system of claim 10 wherein the feed injection line is at least three theoretical stages below the top of a catalyst bed surface.

12. The system of claim 10 wherein the additional feed is a coke-producing heavy hydrocarbon feed selected from the group consisting of sulfur deasphalt pitch, vacuum residue, ethylene furnace tar, and slurry oil.

13. The system of claim 10 wherein the additional feed comprises a slurry feed from a FCC fractionator bottom stream.

14. The system of claim 10 wherein the first stripping gas comprises steam.

15. The system of claim 10 wherein a fraction of the trapped hydrocarbons and the gas product, defining heavy hydrocarbons, is not separated from the spent catalyst and transferred with the spent catalyst to the regenerator.

16. The system of claim 10 wherein the heat produced in the regenerator supplies the reactor with at least approximately 600 BTU per pound of feedstock.

17. The system of claim 10 wherein the first stripping gas and the second stripping gas comprise steam.

18. The system of claim 10 wherein the gas product formed in the second stage of the stripper section is separated from the stripper section through a second stage gas product line before contact with the first stage of the stripper section.

* * * * *